3,328,310
OPTICALLY BRIGHTENED ORGANIC
COMPOSITIONS
Erwin Maeder, Aesch, Basel-Land, Peter Liechti, Binningen, and Adolf Emil Siegrist, Basel, Switzerland, assignors to Ciba Limited, Basel, Switzerland, a Swiss company
No Drawing. Filed Dec. 4, 1963, Ser. No. 328,058
Claims priority, application Switzerland, Dec. 21, 1962, 15,058/62
14 Claims. (Cl. 252—301.2)

The present invention relates to organic compositions optically brightened with novel oxazolyl-thiophene compounds of the formula (1)
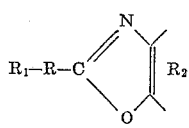

wherein $R_1$ represents a benzene radical, R stands for a thiophene radical which is linked in position 2 with $R_1$ and in position 5 with the oxazole ring, $R_2$ is a benzene radical which is condensed with the oxazole ring in the manner indicated by the valence dashes, and at least one of the benzene radicals $R_1$ and $R_2$ contains at least one carboxylic acid group or functionally converted oxygen containing carboxylic acid group linked directly with a carbon atom of the benzene ring.

The carboxylic acid group referred to may be a free or neutralized carboxyl group or a functionally converted carboxyl group, provided the latter likewise contains the oxo-oxygen atom. Suitable functionally converted carboxylic acid groups are above all the carboxylic acid ester groups and among them the alkyl ester groups; furthermore alkenyl ester, aryl ester and aralkyl ester groups. Likewise suitable are carboxylic acid amide and carboxylic acid hydrazide groups, either of which may have substituents attached to the nitrogen atoms. A possibly functionally modified carboxylic acid group is preferably linked directly with $R_2$, inter alia also because this type of compound is readily accessible.

Special mention deserve oxazolyl-thiophene compounds of the formula (2)
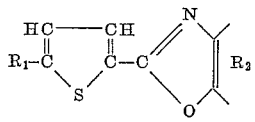

in which $R_1$ and $R_2$ have the above meanings and the benzene radical $R_2$ contains a carboxylic acid, carboxylic acid ester, carboxylic acid amide or carboxylic acid hydrazide group linked directly with the benzene ring. In addition to this latter group the radical $R_2$ may contain further substituents, above all alkyl groups. Thus, the radical $R_2$ corresponds primarily to the formula (3)
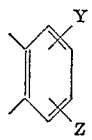

in which Y represents a hydrogen atom or an alkyl group with up to 4 carbon atoms, and Z represents a carboxylic acid, carboxylic acid ester or carboxylic acid amide group. The benzene radical may likewise contain substituents so that the oxazolyl-thiophene compounds correspond, for example, to the formula (4)
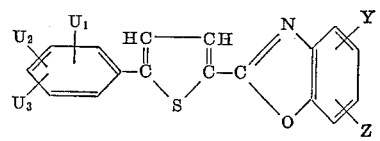

in which $U_1$ and $U_2$ each represents a hydrogen atom, a halogen atom, or an alkyl or alkoxy group with 1 to 4 carbon atoms, $U_3$ and Y each represents a hydrogen atom or an alkyl group with 1 to 4 carbon atoms, and Z stands for a free or neutralized carboxyl group, a carboxylic acid (lower or higher) alkyl ester group, a carboxylic acid (lower) alkenyl ester group, a carboxylic acid ar(lower) alkyl ester group, for example a carboxylic acid benzyl ester group, a carboxylic acid aryl ester group such as

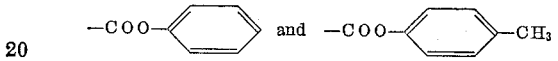

the carboxylic acid amide group —CO—NH$_2$, a carboxylic acid amide group organically substituted at the nitrogen such, for example, as

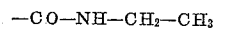

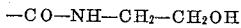

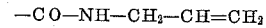

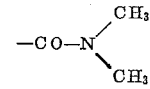

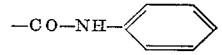

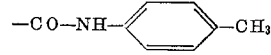

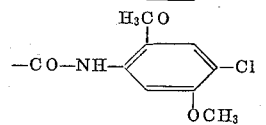

and

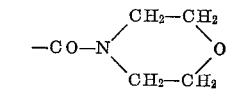

or a carboxylic acid hydrazide group.

The oxazolyl-thiophene compounds of the Formula 1 can be manufactured by the conventional methods. Those which contain the possibly modified carboxylic acid group in the radical $R_2$ can be manufactured by reacting a monocarboxylic acid of the formula (5)        $R_1$—R—COOH at an elevated temperature and preferably in the presence of a catalyst with an aminohydroxy compound of the formula (6)
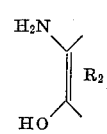

—in which R, $R_1$ and $R_2$ have the above meanings and the radical $R_2$ contains a carboxylic acid ester group—whereupon the carboxylic acid ester group present in the resulting product may be hydrolyzed and/or, if desired, converted into another functionally modified carboxylic acid group. The carboxylic acid ester group, preferably carboxylic acid lower alkyl ester groups such as the carbomethoxy group, can, for example be transesterified or hydrolyzed and from the free carboxylic acids obtained in this manner there can be prepared in the conventional manner the acid halides and from the latter, acid amides or acid hydrazides can be manufactured.

The monocarboxylic acids of the Formula 5 and aminocarboxylic acid esters of the Formula 6 used as starting materials in the described process are either known or, if new, can be prepared by known methods (see e.g., Journ. Org. Chem. 21, pages 39 to 44 [1956]).

The new oxazolyl-thiophene compounds of the Formula 1 can be used for optically brightening a wide variety of organic materials. Good results are obtained, for example, in brightening polyolefines such as polyethylene and polypropylene, acrylic resin lacquers, alkyd resin lacquers, cellulose ester lacquers, for example acetylcellulose lacquers, or nitrocellulose ester lacquers. Above all, the new thiophene derivatives are suitable for optically brightening synthetic fibers, for example of cellulose esters such as cellulose propionate or acetylcellulose (cellulose diacetate or cellulose triacetate; acetate rayon), and especially polyamides (for example nylon) and polyesters (for example Dacron or Terylene), or fibers of polyolefines such as polyethylene and polypropylene, of polyvinyl chloride or polyvinylidine chloride, as well as films, foils, tapes or shaped structures made from these materials or other materials such as polystyrene, polyvinyl alcohol or polyvinyl esters of organic acids, for example polyvinyl acetate.

For optically brightening synthetic fibers—which may be present in the form of staple fibers or continuous filaments, in the raw state, in the form of hanks or fabrics—it is of advantage to use an aqueous medium in which the selected thiophene compound is suspended. If desired there may be concomitantly used in the treatment dispersing agents such, for example, as soaps, polyglycol ethers of fatty alcohol, fatty amines or alkylphenols, cellulose sulfite waste liquor or condensation products of formaldehyde with optionally alkylated naphthalenesulfonic acid.

It has proved particularly advantageous to work in a neutral, weakly alkaline or acid bath. Likewise it is of advantage to perform the treatment at an elevated temperature from about 50 to 100° C., for example at the boiling temperature of the bath or in its vicinity (at about 90° C.). The improvement according to the invention may also be performed in a solution in an organic solvent.

The new thiophene derivatives to be used according to the invention may also be added to or incorporated with the materials before or during their shaping. Thus for instance they may be added to the moulding composition used in the manufacture of films, foils, tapes or shaped structures, or they may be dissolved or finely dispersed in the spinning mass prior to the spinning operation. The new thiophene derivatives may also advantageously be added to the reaction batch before or during the polycondensation yielding, for example, polyamides or polyesters or to the polymerization batches before or during the polymerization of monomers, for example, vinyl acetate, vinyl chloride and acrylonitrile.

The amount of thiophene derivative to be used according to the invention, referred to the weight of the organic material to be optically brightened, may vary within wide limits. Even a very small amount—in some cases as little as 0.01%—may produce a distinct and durable effect. While in general an amount of more than 2% does not prove harmful, it does not offer any advantage over the normal amount either.

The new thiophene derivatives acting as brighteners may also be used in the following ways:

(a) In admixture with dyestuffs or pigments or as additives to dyebaths, printing, discharge or resist pastes. Also for after-treating dyeings, prints or discharge effects.

(b) In admixture with chemical bleaches or as additives to bleaching baths.

(c) In admixture with finishing auxiliaries, such as starch or synthetically produced finishing auxiliaries. The products of the invention may, for example, also be added to the liquors used to achieve an anti-crease finish.

(d) In combination with detergents. The detergent and the brightener may be added separately to the washing liquor. It is also of advantage to use detergents that already contain a proportion of the brightener. Suitable detergents are, for example, soaps, salts of sulfonate detergents such, for example, as sulfonated benzimidazoles substituted at the 2-carbon atom by higher alkyl radicals, furthermore salts of mono-carboxylic acid esters of 4-sulfophthalic acid with higher fatty alcohols; also salts of fatty alcohol sulfonates, alkylarylsulfonic acids or condensation products of higher fatty acids with aliphatic hydroxysulfonic or aminosulfonic acids. Further suitable are non-ionic detergents, for example polyglycol ethers derived from ethylene oxide and higher fatty alcohols, alkylphenols or fatty amines.

When the present process is combined with other treatment or improvement operations, it is of advantage to perform such a combined treatment with the aid of suitable preparations. These stable preparations are distinguished by the fact that they contain compounds of the above Formula 1 as well as dispersing agents, detergents, dyestuffs, pigments or finishing auxiliaries.

The compounds of the above Formula 1 may also be applied after having been fixed on a finely dispersed vehicle.

Unless otherwise indicated, parts and percentages in the following examples are by weight.

EXAMPLE 1

51 parts of 5-phenylthiophene-2-carboxylic acid, 40 parts of 4 - hydroxy - 3 - aminobenzene - 1 - carboxylic acid methyl ester and 2 parts of boric are stirred under nitrogen with 150 parts by volume of diethyleneglycol diethyl ether. In the course of one hour the batch is heated to 185–190° C., whereupon a turbid, dark solution forms and water escapes. The reaction mixture is stirred for 1 to 2 hours at this temperature, and the solvent is then slowly evaporated. The reaction mixture forms a turbid, dark melt which is stirred for 2 hours at 260° C., then allowed to cool, the solidified melt is dissolved in 1000 parts by volume of hot dimethylformamide, the undissolved residue is filtered off, the filtrate is strongly concentrated and the reaction product is precipitated with methanol. After cooling, the precipitate is suctioned off, thoroughly expressed and the filter cake is washed with methanol.

The residue is recrystallized from dioxane, to yield about 50 parts of a light-beige powder of the formula (7)

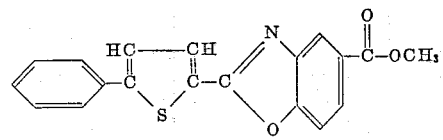

melting at 178 to 180° C. Repeated recrystallization from dioxane and clarification with active carbon furnishes small, substantially colorless needles melting at 194–195° C.

*Analysis.*—Calculated for $C_{19}H_{13}NO_3S$: C, 68.04%; H, 3.91%; N, 4.18%. Found: C, 67.95%; H, 3.96%; N, 4.11%.

A mixture of 33.5 parts of the compound of the Formula 7, 40 parts of sodium hydroxide, 100 parts of water and 400 parts by volume of ethanol is refluxed for 24 hours, then diluted with 500 parts of water, and the ethanol is suctioned off under vacuum. The batch is acidified, the precipitate is filtered off and the filtrate is washed with water until it gives a neutral reaction. Yield: about 27 parts of a brown powder. The product of the formula (8)
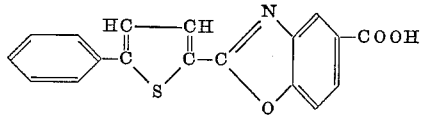

is obtained on repeated recrystallization from dichlorobenzene as a yellowish powder melting at 281 to 283° C.

*Analysis.*—Calculated for $C_{18}H_{11}NO_3S$: C, 67.28%; H, 3.45%; N, 4.36%. Found: C, 67.26%; H, 3.50%; N, 4.34%.

EXAMPLE 2

30 parts of 5 - (4' - methoxyphenyl) - thiophene-2-carboxylic acid are refluxed for 12 hours with 100 parts of thionyl chloride, during which hydrochloric acid gas escapes and a clear solution is formed. The excess thionyl chloride is then evaporated under vacuum. The residual acid chloride is dissolved in 400 parts by volume of dry xylene, 21.4 parts of finely comminuted 4-hydroxy-3-aminobenzoic acid methyl ester are added at room temperature and the mixture is raised to the reflux temperature, which causes hydrochloric acid to escape. After having been refluxed for 24 hours the batch is allowed to cool, suction-filtered, and the residue is washed with methanol and dried, to yield about 37 parts of a light-beige powder of the formula (9)
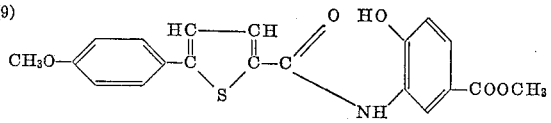

melting at 258 to 260° C.

37 parts of the compound of the Formula 9 are triturated with 1.5 parts of boric acid and heated for 1 hour at 230 to 240° C. under nitrogen, whereupon water escapes and a dark melt forms which is allowed to cool, the solid melt is dissolved in methylene chloride, filtered through 200 parts of active alumina and rinsed with methylene chloride. The batch is evaporated to dryness and the residue crystallized from acetone and dried, to yield about 16 parts of the compound of the formula

(10)
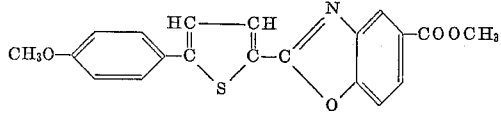

in the form of small, pale-yellow needles melting at 179 to 180° C. The analytically pure product obtained by distillation under a high vacuum melts at 184 to 185° C.

*Analysis.*—Calculated for $C_{20}H_{15}NO_4S$: C, 65.74%; H, 4.14%; N, 3.83%. Found: C, 65.44%; H, 4.04%; N, 3.75%.

6.7 parts of the compound of the Formula 10 are refluxed for 2 hours with a solution of 2.2 parts of sodium hydroxide in 50 parts of water and 50 parts by volume of methanol, whereupon a thickly liquid, pale-yellow suspension is obtained which is suction-filtered. The residue is washed with water, suspended in 150 parts by volume of dimethylformamide, acidified with dilute acetic acid, and the light-yellow precipitate is suctioned off and washed with water until the washings run neutral. On recrystallization from a large quantity of acetone there are obtained about 4 parts of a light-yellow crystalline powder of the formula

(11)
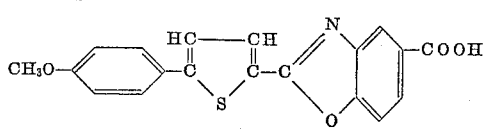

which melts at 291 to 292° C. The analytically pure product obtained by sublimation in a high vacuum melts at 293 to 294° C.

*Analysis.*—Calculated for $C_{19}H_{13}NO_4S$: C, 64.95%; H, 3.73%; N, 3.99%. Found: C, 64.64%; H, 3.62%; N, 4.21%.

EXAMPLE 3

A mixture of 4 parts of 5-(4'-methylphenyl)-thiophene-2-carboxylic acid and 20 parts by volume of thionyl chloride is refluxed for 12 hours, during which hydrochloric acid gas escapes and a clear solution is formed. The excess thionyl chloride is then evaporated under vacuum. The yellow residue is dissolved in 100 parts by volume of dry xylene and 3.1 parts of 4-hydroxy-3-amino-1-benzoic acid methyl ester are added. The batch is raised to the reflux temperature, with hydrochloric acid gas escaping. After 18 hours the evolution of hydrochloric acid ceases. The reaction mixture is cooled to room temperature, suction-filtered and the filter cake is washed with methanol.

After drying there are obtained about 4 parts of the compound of the formula

(12)
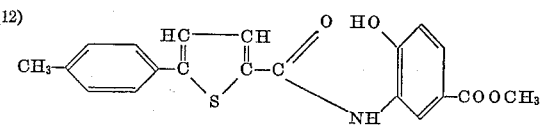

as a light-brown powder melting at 274 to 276° C.

4 parts of the compound of the Formula 12 are mixed with 0.2 part of boric acid and 3 parts by volume of triethyleneglycol dimethyl ether, and the whole is heated under nitrogen for 1½ hours at 230 to 235° C., whereupon a dark solution forms which is allowed to cod and diluted with a small amount of methanol. The batch is suction-filtered and the residue is dried, to yield about 2 parts of the compound of the formula

(13)
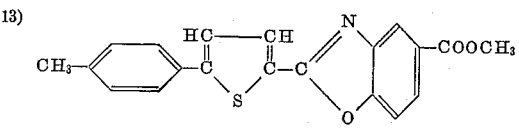

in the form of a light-beige powder melting at 168–170° C. On recrystallization from toluene+methanol and clarification with active carbon there are obtained small, colorless needles melting at 175–176° C.

*Analysis.*—Calculated for $C_{20}H_{15}NO_3S$: C, 68.75%; H, 4.33%; N, 4.01%. Found: C, 68.74%; H, 4.34%; N, 4.14%.

When 5 - (4'-methylphenyl) - thiophene - 2 - carboxylic acid is replaced by an equivalent amount of 5 - (4'-chloro-2':5'-dimethoxy) - thiophene - 2 - carboxylic acid and the condensation is performed in identical manner, the compound of the formula

(14)
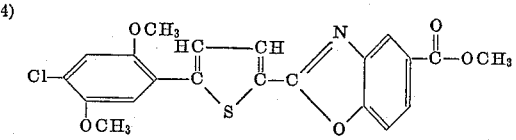

is obtained on recrystallization from dioxane in a similar yield and purity in the form of small yellow needles melting at 228 to 229° C.

*Analysis.*—Calculated for $C_{21}H_{16}NO_5SCl$: C, 58.68%; H, 3.75%; N, 3.26%. Found: C, 58.24%; H, 3.76%; N, 3.28%.

EXAMPLE 4

A mixture of 9.6 parts of the compound of the Formula 8 and 30 parts by volume of thionyl chloride is refluxed for 12 hours, during which hydrochloric acid gas escapes and a solution forms. The excess thionyl chloride is then evaporated under vacuum. 30 parts by volume of dry pyridine are added to the solid residue and while cooling the resulting suspension 4.5 parts of morpholine are dropped in; the batch is then heated for 3 hours at the boil, allowed to cool, diluted with 50 parts by volume of methanol, suction-filtered, and the residue is rinsed with methanol. Two recrystallizations from ethanol and clarification with active carbon furnish about 7.2 parts of the compound of the formula (15)

in the form of yellowish tinsel melting at 189.5 to 190.5° C.

*Analysis.*—Calculated for $C_{22}H_{18}N_2O_3S$: C, 67.67%; H, 4.65%; N, 7.17%. Found: C, 67.38%; H, 4.83%; N, 7.26%.

When morpholine is replaced by an equimolecular quantity of aniline and the condensation is carried out in identical manner, the compound of the formula (16)

is obtained on recrystallization from dioxane in an approximately equal purity and yield in the form of colorless flakes melting at 240 to 241° C.

*Analysis.*—Calculated for $C_{24}H_{16}N_2O_2S$: C, 72.71%; H, 4.07%; N, 7.07%. Found: C, 72.62%; H, 3.96%; N, 6.96%.

When the condensation is performed with 4-chloro-2:5-dimethoxyaniline instead of with morpholine, the compound of the formula (17)

is obtained on recrystallization from benzene in the form of a colorless crystalline powder melting at 200 to 201° C.

*Analysis.*—Calculated for $C_{26}H_{19}N_2O_4SCl$: C, 63.61%; H, 3.90%; N, 5.71%. Found: C, 63.79%; H, 3.86%; N, 5.61%.

An alternative condensation with 1-hydroxy-2-aminoethane yields on recrystallization from ethanol the compound of the formula (18)

as a colorless crystalline precipitate melting at 217.5 to 218° C.

*Analysis.*—Calculated for $C_{20}H_{16}N_2O_3S$: C, 65.92%; H, 4.63%; N, 7.69%. Found: C, 65.91%; H, 4.61%; N, 7.85%.

Condensation with allylamine gives rise to the compound of the formula (19)

which on recrystallization from dioxane forms yellowish prisms melting at 222 to 223° C.

*Analysis.*—Calculated for $C_{21}H_{16}N_2O_2S$: C, 69.98%; H, 4.47%; N, 7.77%. Found: C, 69.71%; H, 4.50%; N, 7.91%.

EXAMPLE 5

10 parts of the compound of the Formula 8 are refluxed with 30 parts by volume of thionyl chloride until hydrochloric acid gas is no longer being evolved. The excess thionyl chloride is evaporated under vacuum, the solid residue is dissolved in 75 parts by volume of dry methylene chloride and while stirring the whole ammonia gas is introduced, whereupon the amide precipitates as a fine powder. The whole is evaporated to dryness, and the residue is comminuted and extracted by being boiled with water. Crystallization from dioxane+ethyl acetate furnishes about 8 parts of the compound of the formula (20)

in the form of a light-beige crystaline powder melting at 238 to 240° C. The analytically pure product obtained by another recrystallization from dioxane+ethyl acetate melts at 239 to 241° C.

*Analysis.*—Calculated for $C_{18}H_{12}N_2O_2S$: C, 67.48%; H, 3.78%; N, 8.74%. Found: C, 67.51%; H, 4.02%; N, 8.94%.

EXAMPLE 6

32 parts of the compound of the Formula 8 are refluxed for 12 hours with 100 parts by volume of thionyl chloride, during which hydrochloric acid gas escapes and a solution forms. The excess thionyl chloride is then evaporated under vacuum and the solid residue is stirred with 100 parts by volume of dry pyridine. While cooling the batch, 10 parts of allyl alcohol are then dropped in and the reaction mixture is stirred for 2 hours at 100° C., allowed to cool, poured into water, the brown precipitate is filtered off and rinsed with water. After drying, the reaction product is dissolved in methylene chloride, filtered through 400 parts of active alumina, and the filter residue is rinsed with methylene chloride. After considerable concentration the product is precipitated from the eluate by adding methanol. After drying there are obtained about 28 parts of the compound of the formula (21)

as a yellow, crystalline precipitate melting at 151 to 152° C. Crystallization from cyclohexane furnishes yellowish, small needles melting at 155.5 to 156.5° C.

*Analysis.*—Calculated for $C_{21}H_{15}NO_3S$: C, 69.79%; H, 4.18%; N, 3.88%. Found: C, 70.10%; H, 4.34%; N, 3.90%.

When allyl alcohol is replaced by benzyl alcohol and the condensation is performed similarly, the compound of the formula (22)

is obtained in an approximately equal yield and purity as a colorless, crystalline powder melting at 167 to 168° C. from acetone.

*Analysis.*—Calculated for $C_{25}H_{28}NO_3S$: C, 72.97%; H, 4.16%; N, 3.40%. Found: C, 72.88%; H, 4.30%; N, 3.45%.

An alternative condensation with 4-hydroxy-1-methylbenzene yields the compound of the formula

(23)
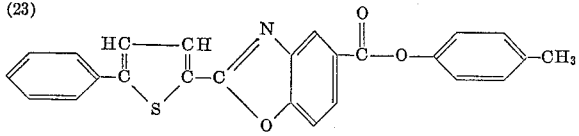

which is obtained from chlorobenzene+alcohol in small, colorless needles melting at 207.5 to 208.5° C.

*Analysis.*—Calculated for $C_{25}H_{17}NO_3S$: C, 72.97%; H, 4.16%; N, 3.40%. Found: C, 72.71%; H, 4.08%; N, 3.43%.

When the condensation is carried out with 2-hydroxypropane, the compound of the formula

(24)
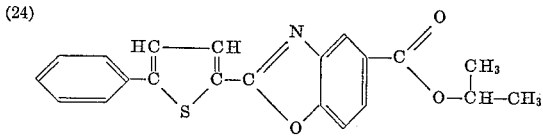

is obtained in the form of a yellowish, crystalline powder melting at 141.5 to 142° C.

*Analysis.*—Calculated for $C_{21}H_{17}NO_3S$: C, 69.40%; H, 4.72%; N, 3.85%. Found: C, 69.52%; H, 4.66%; N, 3.85%.

Condensation with 1-hydroxy-2-ethylhexane gives rise to the compound of the formula

(25)
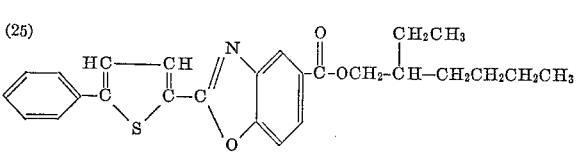

in the form of a colorless, crystalline powder melting at 147 to 148° C.

*Analysis.*—Calculated for $C_2 H_{27}NO_3S$: S, 72.03%; H, 6.27%; N, 3.23%. Found: S, 71.88%; H, 5.93%; N, 3.51%.

When the condensation is carried out with 1-hydroxyhexadecane, there is obtained the compound of the formula

(26)
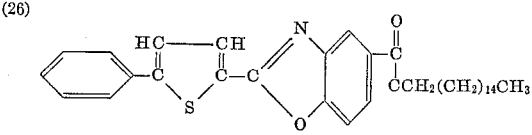

as a colorless, crystalline powder melting at 106 to 108° C.

*Analysis.*—Calculated for $C_{34}H_{43}NO_3S$: C, 74.82%; H, 7.84%; N, 2.57%. Found: C, 74.78%; H, 7.99%; N, 2.52%.

Condensation with diethyleneglycol mono-n-butyl ether gives rise to the compound of the formula in the form of a colorless, waxy precipitate from methylene chloride+petroleum ether.

*Analysis.*—Calculated for $C_{26}H_{27}NO_5S$: C, 67.08%; H, 5.85%; N, 3.01%. Found: C, 67.01%; H, 5.86%; N, 2.98%.

EXAMPLE 7

A mixture of 0.95 part of calcium hydroxide in 500 parts of water with 8 parts of finely ground compound of the Formula 8 is stirred for 6 hours at 80 to 85° C. The batch is then allowed to cool, suction-filtered at room temperature and the filter residue is thoroughly washed with water. Any free carboxylic acid left is removed by stirring with 200 parts by volume of boiling dioxane for a short time. The hot residue is suctioned off and washed with a small amount of hot dioxane.

After drying, there are obtained about 7.9 parts of the compound of the formula

(28)
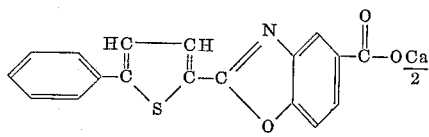

as a yellowish powder which does not melt below 320° C.

EXAMPLE 8

An intimate mixture of 100 parts of a polyester granulate of polyterephthalic acid ethyleneglycol ester and 0.05 to 0.1 part of the compound of the Formula 8 is melted at 285° C. while being stirred. When this spinning composition is spun through conventional spinnerets, considerably brightened polyester fibers are obtained.

If desired, the compound of the Formula 8 may alternatively be added to the reaction mixture which yields the polyester before or during the polycondensation.

Similiar brightening effects are achieved by using instead of the compound of the Formula 8 one of the compounds of the Formulas 7, 10, 11 or 13 to 28.

EXAMPLE 9

10,000 parts of a polyamide in chip form, prepared in known manner from hexamethylenediamine adipate, are mixed with 30 parts of titanium dioxide (rutile modification) and 10 parts of the compound of the formula 8 for 12 hours in a tumbler. The chips treated in this manner are freed from atmospheric oxygen by means of superheated steam, then melted in a boiler heated with oil vapour or diphenyl vapour at 300 to 310° C., and stirred for half an hour. The melt is then expressed through a spinneret under a nitrogen pressure of 5 atmospheres (gauge), and the resulting filament is allowed to cool and then wound on a spinning bobbin. The filaments obtained in this manner display an excellent brightening effect which is fast to heat-setting and has good fastness to washing and light.

Alternatively, the compound of the Formula 8 can be added to the reaction mixture before or during the polycondensation that gives rise to the polyamide.

When the compound of the Formula 8 is replaced by the compound of the Formula 7, 10, 11 or 13 to 28, similar brightening effects are obtained.

What is claimed is:

1. An optically brightened composition of matter comprising an organic polymeric material selected from the group consisting of acrylic resins, cellulose esters, polyamides, polyesters, polyolefines, polyvinyl chlorides, poly-

(27)
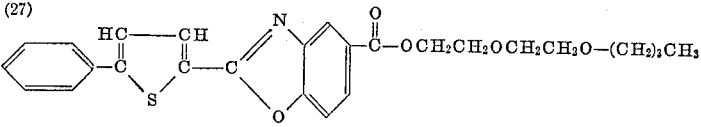

vinylidene chlorides, polystyrenes, polyvinyl alcohols, and as an optical brightener for said organic polymeric material a small amount of an oxazolyl-thiophene compound of the formula

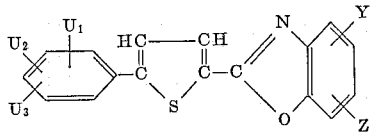

wherein $U_1$ and $U_2$ each represents a member selected from the group consisting of hydrogen, halogen, lower alkyl and lower alkoxy, $U_3$ and Y each is a member selected from the group consisting of hydrogen and lower alkyl, and Z is a member selected from the group consisting of carboxy, carbalkoxy, carbo(lower)alkenyloxy, carbaryl(lower)alkoxy, carbaryloxy, carbamyl, lower alkylcarbamyl, hydroxy(lower)alkylcarbamyl, lower alkenylcarbamyl, arylcarbamyl and

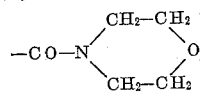

2. An optically brightened composition of matter comprising essentially a synthetic linear polyester and, as an optical brightener for said polyester, a small amount of an oxazolyl-thiophene compound of the formula

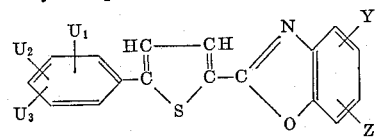

wherein $U_1$ and $U_2$ each represents a member selected from the group consisting of hydrogen, halogen, lower alkyl and lower alkoxy, $U_3$ and Y each is a member selected from the group consisting of hydrogen and lower alkyl, and Z is a member selected from the group consisting of carboxy, carbalkoxy, carbo(lower)alkenyloxy, carbaryl(lower)alkoxy, carbaryloxy, carbamyl, lower alkylcarbamyl, hydroxy(lower)alkylcarbamyl, lower alkenylcarbamyl, arylcarbamyl and

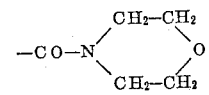

3. An optically brightened composition of matter comprising essentially a synthetic linear polyamide and, as an optical brightener for said polyamide, a small amount of an oxazolyl-thiophene compound of the formula

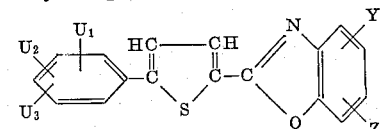

wherein $U_1$ and $U_2$ each represents a member selected from the group consisting of hydrogen, halogen, lower alkyl and lower alkoxy, $U_3$ and Y each is a member selected from the group consisting of hydrogen and lower alkyl, and Z is a member selected from the group consisting of carboxy, carbalkoxy, carbo(lower)alkenyloxy, carbaryl(lower)alkoxy, carbaryloxy, carbamyl, lower alkylcarbamyl, hydroxy(lower)alkylcarbamyl, lower alkenylcarbamyl, arylcarbamyl and

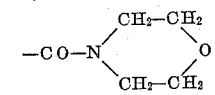

4. An optically brightened composition of matter comprising essentially a synthetic linear polyamide and as an optical brightener for said polyamide a small amount of an oxazolyl-thiophene compound of the formula

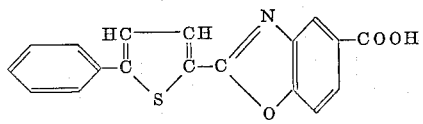

5. An optically brightened composition of matter comprising essentially a synthetic linear polyester and as an optical brightener for said polyester a small amount of an oxazolyl-thiophene compound of the formula

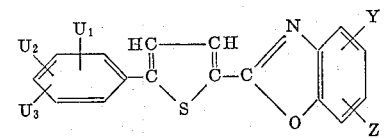

6. An optically brightened composition of matter according to claim 4 which is in the form of fibers.

7. An optically brightened composition of matter according to claim 5 which is in the form of fibers.

8. An optically brightened composition of matter comprising an organic material selected from the group consisting of linear polyamides and linear polyesters and as an optical brightener for said material a small amount of an oxazolyl-thiophene compound of the formula

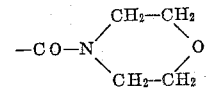

wherein $U_1$ and $U_2$ each represents a member selected from the group consisting of hydrogen, halogen, lower alkyl and lower alkoxy, $U_3$ and Y each is a member selected from the group consisting of hydrogen and lower alkyl, and Z is a member selected from the group consisting of carboxy, carbalkoxy, carbo(lower)alkenyloxy, carbaryl(lower)alkoxy, carbaryloxy, carbamyl, lower alkylcarbamyl, hydroxy(lower)alkylcarbamyl, lower alkenylcarbamyl, arylcarbamyl and

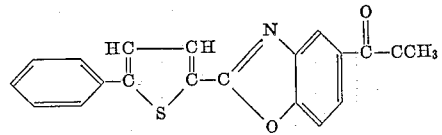

9. An optically brightened composition of matter according to claim 8 wherein the oxazolyl-thiophene compound corresponds to the formula:

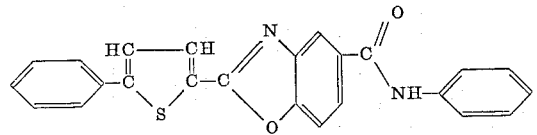

10. An optically brightened composition of matter according to claim 8 wherein the oxazolyl-thiophene compound corresponds to the formula:

11. An optically brightened composition of matter according to claim 8 wherein the oxazolyl-thiophene compound corresponds to the formula:

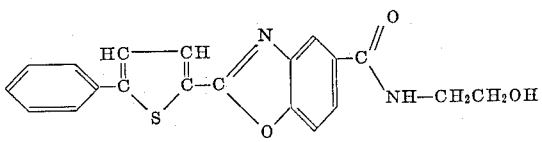

12. An optically brightened composition of matter according to claim 8 wherein the oxazolyl-thiophene compound corresponds to the formula:

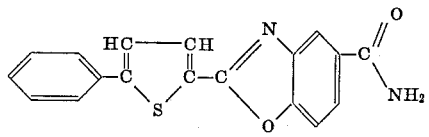

13. An optically brightened composition of matter according to claim 8 wherein the oxazolyl-thiophene compound corresponds to the formula:

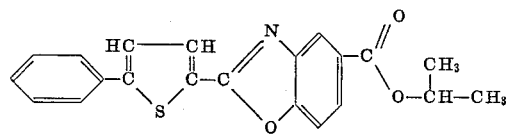

14. An optically brightened composition of matter according to claim 8 wherein the oxazolyl thiophene compound corresponding to the formula:

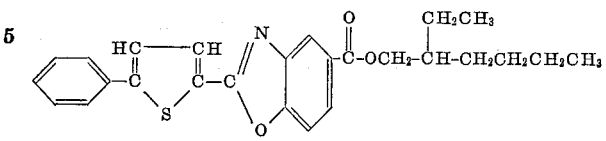

References Cited

UNITED STATES PATENTS 2,995,564   8/1961   Duennenberger et al.
                                       252—301.2

SAMUEL H. BLECH, *Primary Examiner.*

WILLIAM H. SHORT, *Examiner.*

R. LYON, *Assistant Examiner.*